Aug. 1, 1944.  C. G. STRANDLUND  2,354,891
LEVER
Filed Nov. 30, 1942   2 Sheets-Sheet 1
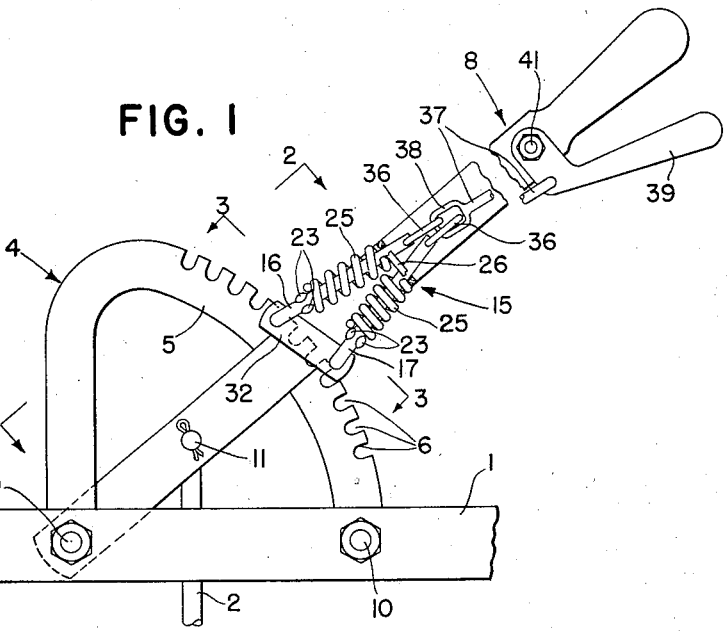
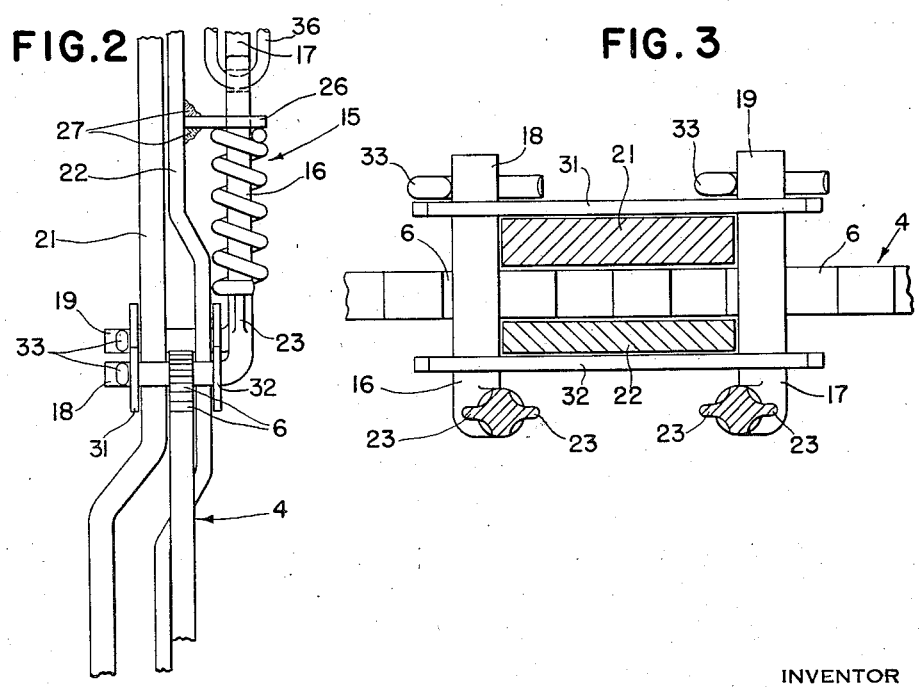
INVENTOR
Carl G. Strandlund Aug. 1, 1944.  C. G. STRANDLUND  2,354,891
LEVER
Filed Nov. 30, 1942  2 Sheets-Sheet 2

INVENTOR.
Carl G. Strandlund
BY
ATTORNEYS

Patented Aug. 1, 1944

2,354,891

UNITED STATES PATENT OFFICE 2,354,891

LEVER

Carl G. Strandlund, Moline, Ill., assignor to Deere & Company, Moline, Ill., a corporation of Illinois Application November 30, 1942, Serial No. 467,437

7 Claims. (Cl. 74—537)

The present invention relates generally to agricultural implements, more particularly to new and improved lever mechanisms for adjusting and locking in position one or more movable parts of the implement, for example, cultivators, plows, mowers, and other implements.

The object and general nature of this invention is the provision of new and improved lever mechanism so constructed and arranged as to secure relatively fine adjustment with sectors or racks having relatively coarse notches. Another feature of this invention is the provision of detent mechanism of this character in which aperturing or slotting of the lever adjacent the sector is entirely eliminated. Heretofore, most detent mechanisms have required that the lever be slotted adjacent the sector or rack in order to provide for the proper movement of the detent mechanism. It has been found that since the lever is not only slotted at this point but is also held more or less by the sector, lateral oscillation or vibration of the lever in use has frequently resulted in breakage of the lever at this point. Hence, the provision of detent mechanism not requiring any slotting or aperturing is a distinct advantage.

These and other objects and advantages of the present invention will be apparent to those skilled in the art after a consideration of the following description, taken in conjunction with the accompanying drawings in which the preferred structural arrangements incorporating the principles of the present invention have been illustrated.

In the drawings:

Figure 1 is a side view of the adjusting lever of an implement, such as a plow, in which the principles of the present invention have been incorporated;

Figure 2 is a view drawn to an enlarged scale substantially along the line 2—2 of Figure 1;

Figure 3 is a view taken generally along the line 3—3 of Figure 1, also at an enlarged scale;

Figure 4:
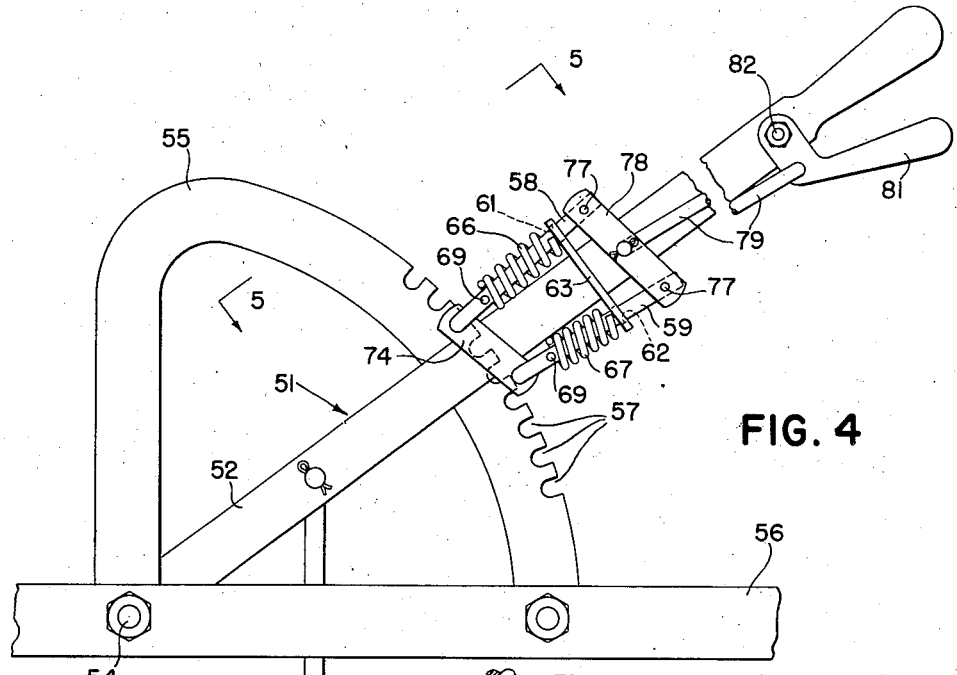
Figure 4 is a side view, similar to Figure 1, showing a modified form of the present invention.

Referring now more particularly to Figures 1-3, the reference numeral 1 indicates the frame of an agricultural machine, such as a plow, having a part, such as a crank axle (not shown), swingably connected with the frame or plow beam 1 and moved to different positions relative thereto by a link 2. Secured to the frame or beam 1 in any suitable manner is a sector 4 having an arcuate section 5 provided with a plurality of notches 6 and generally of conventional construction. A hand lever, indicated in its entirety by the reference numeral 8, is pivoted, as by a bolt 9, to the sector 4, a bolt 10 cooperating with the bolt 9 for securing the sector 4 to the beam 1. The upper end of the link 2 is pivoted to the lever 8 at any suitable point thereon, as indicated by the reference numeral 11.

Detent mechanism, with which the present invention is more particularly concerned and which is indicated in its entirety by the reference numeral 15, is carried by the lever 8 and cooperates with the notched sector for locking the lever 8 in different positions of adjustment. The detent mechanism 15 comprises a pair of detent members 16 and 17, preferably but not necessarily identical, and each detent member includes a laterally directed section, such sections being represented in Figure 3 by the reference numerals 18 and 19, respectively. The lever 8 comprises a main member 21 and a hammer strap or auxiliary member 22, such members being disposed at opposite sides of the notched portion 5 of the sector 4, as best shown in Figure 3. Also, each of the detent members 16 and 17 is provided with a pair of flattened sections 23 which serve as abutments against which the lower ends of springs 25 bear, there being a spring 25 about each of the detent members. The upper ends of the springs 25 bear against an abutment 26 in the form of a bracket welded, as at 27, or otherwise fixed to the lever 8. A pair of tie links 31 and 32 are apertured to receive the detent sections 18 and 19 and lie on opposite sides of the members 21 and 22 making up the hand lever 8. Cotter pins 33 are passed through openings in the detent sections 18 and 19 for holding the link 31 in place, the other link 32 being held in place by the main body of the detent members, as best shown in Figure 2. For purposes of clarity and simplicity the springs 25 are omitted in Figure 2.

Each of the upper or outer ends of the detent members 16 and 17 is apertured to receive a link 36, and connected to the two links 36 is a single actuating member in the form of a rod 37 having at its lower end an eye 38 loosely receiving the links 36. The upper or outer end of the actuating rod 37 is pivoted to a hand grip 39 which is swingably connected, as at 41, to the upper or outer end of the hand lever 8. The loose link connection 36 between the two detent members 16 and 17 and the single actuating member 37 forms, in effect, a one-way connection between each detent member and the actuating rod 37 whereby, as shown in Figure 1, one detent member may lie in a position engaging a notch of the sector 4 while the other detent member may be disposed in a more outwardly displaced position, whereby when the hand grip 39 is moved toward the lever 8, a direct pull is immediately transmitted to that detent member that is in engagement with the notched sector, but the connections are such that when the hand lever 39 lies close to or against the end of the lever 8, both detent members 16 and 17 are held in a position with their detent sections 18 and 19 entirely out of engagement with the sector 4. It will also be observed from Figure 1 that the spacing between the detent sections, as determined and maintained by the tie links 31 and 32, is such that when one detent section lies in a notch, the other detent section engages substantially midway between two adjacent notches. Thus, detent mechanism of this kind provides twice as many positions as there are notches in the sector. It is also to be observed that there are no slots or apertures in the hand lever 8 adjacent the sector, and hence there is no weakening of the hand lever at this point.

The operation of this form of the present invention is substantially as follows. The tie links 31 and 32 are so constructed that while they are capable of accommodating a certain amount of rocking movement relative to the lever 8, they normally hold both detent sections 18 and 19 substantially against the edges of the hand lever, as shown in Figure 3. Since the links 31 and 32 embrace the sides of the straps making up the lever, and since the detent sections 18 and 19 embrace or engage the edges, it will be seen that the detent unit as a whole is shiftable with respect to the hand lever but, no matter which one of the detent sections, 18 or 19, engages in a notch of the sector, that detent section, together with the tie links 31 and 32 and the other detent section, positively and firmly holds the hand lever against displacement. It is clear from Figure 1 that the connection between the detent members and the single actuating member 37 is such that when the hand grip 39 is closed toward the hand lever 8, there is a direct pull immediately transmitted to that detent section that lies in a notch of the sector, such direct pull compressing the associated spring and moving the detent section out of engagement with the notch, whereupon the hand lever 8 is freed for movement to a new position. If, for example, only a small readjustment is needed, as from the position shown in Figure 1, all that it would be necessary to do would be for the operator to swing the hand grip 39 toward the lever 8 and after the detent section 19 disengages from the notch, shift the lever 8 very slightly upwardly or downwardly, whereupon the other detent section 18 would drop into the adjacent notch, the detent section 19 then resting on top of one of the teeth.

Figure 5:
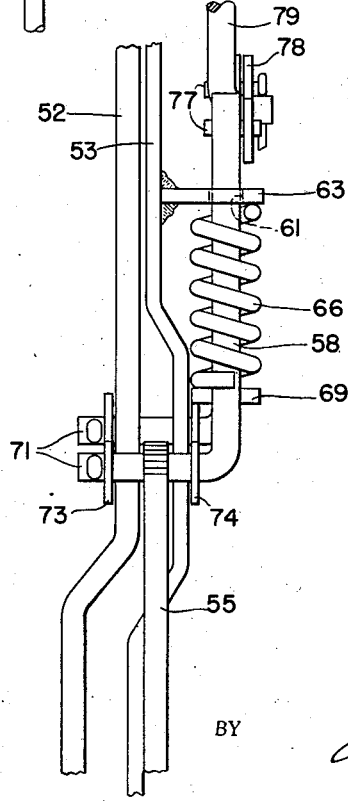
Figure 5 is a view taken generally along the line 5—5 of Figure 4.

Another form of the present invention is illustrated in Figures 4 and 5, to which attention is now directed. In this form of the invention a hand lever 51, which like the hand lever 8 described above, consists of two interconnected strap members 52 and 53, is pivoted at 54 on a sector 55 secured to the beam or frame 56 of the implement. The sector 55 is notched, as at 57, and a pair of detent members 58 and 59, which may be similar to or identical with the detent members 16 and 17 described above, are disposed generally lengthwise of the hand lever 51 and are extended through openings 61 and 62, respectively, in an abutment member 63 welded or otherwise secured to the hand lever 51. Springs 66 and 67 are disposed, respectively, about the detent members, and each spring at one end bears against the abutment 63 and at its other end against a stop 69 carried by the associated detent member. If desired, the detent members may have flattened sections, like the detent members 16 and 17 described above. Each detent member also includes a laterally directed section 71, which serves as a detent proper, and disposed on opposite sides of the hand lever and the sector is a pair of tie links 73 and 74 which are apertured to receive the detent sections 71 and to hold them against opposite edges of the hand lever, but with sufficient looseness to permit a limited amount of rocking movement so that one detent section may be disposed in a notch in the sector while the other detent section may be disposed in a position between adjacent notches, as shown in Figure 4.

At their outer ends each of the detent members 58 and 59 is apertured to receive a pin 77, the pins 77 being carried by an equalizing part 78 to the intermediate portion of which a rod 79 is pivoted. At its outer end, the rod 79 is pivotally connected to a hand grip 81 which is pivoted at 82 to the outer end of the hand lever 51.

The operation of this form of the invention is substantially like that described above and shown in Figures 1-3. A spacing between the detent sections 71 is such that when one detent member lies in a notch in the sector, the other detent member is disposed in a position midway between adjacent notches, and furthermore, the tie links 73 and 74 are disposed at such an angle relative to the hand lever that the idle detent section, the lower one as viewed in Figure 4, lies substantially against the adjacent edge of the hand lever 51. When it is desired to disengage the detent mechanism from the sector 55, the operator swings the hand grip 81 toward the hand lever, exerting a pull through the rod 79 against the pivoted member 78. If the idle detent section 71 is not already against the lower edge of the hand lever 51 (Figure 4) the first or initial movement of the rod 79 causes the idle detent section to swing against the edge of the hand lever. Continued pull on the rod 79 then acts to swing the other detent section 71 out of its notch, thereby disengaging the hand lever from the sector. If only a minor adjustment of the hand lever is desired, the lever may be moved a distance corresponding to half the distance between adjacent notches and the hand grip then released, whereupon the detent section that was formerly idle will enter a notch in the sector while the other detent section will rest on top of one of the teeth, thereby providing for relatively fine adjustments with a relatively coarse notched sector. When disengaging either of the detent sections, it will be noted that the idle detent section will first engage the adjacent edge of the hand lever 51, which thereby serves as a stop limiting further movement of the idle detent section, whereupon continued pull of the detent rod 79 will positively disengage the other detent section. The parts are so proportioned that when the hand grip 81 is fully compressed both detent sections are positively held out of engagement with the notched sector 55. Like the form of the invention shown in Figures 1-3, it will be noted that, by virtue of the embracing relation of the tie links 73 and 74, each detent section serves as means for positively locking the hand lever to the notched sector and holding it against movement in either direction, yet it is not necessary to punch or aperture the hand lever straps.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a lever mechanism, a sector, a lever comprising a pair of strap members pivoted to said sector, the latter being notched, a pair of apertured straps disposed transversely of said lever in embracing relation, detent members lying against opposite edges of said lever straps and extending through the apertures in said transverse straps, the distance between said detent members being such that when one member lies in a notch of said sector the other member is disposed in a position between notches, whereby a relatively small movement of said lever in one direction or the other corresponding to half the distance between notches will provide for movement of the other detent member into a notch, and means on said lever for disengaging both of said detent members from said sector.

2. In a lever mechanism, a sector, a lever pivoted with respect thereto, said sector being notched, a pair of detent members movable along opposite edges of said lever into and out of engagement with said notches, means extending across said lever and receiving, adjacent its ends, the portions of said detent members that engage said notches, said means serving to hold said detent members substantially alongside the notches of said sector against opposite edges of said lever, whereby the engagement of either of said detent members into one of the notches of said sector acts to lock said lever thereto, and means connected with the means that extends across the lever for operating said detent members.

3. In a lever and sector mechanism, including a notched sector and a lever movable relative thereto, a pair of strap members, each apertured at its ends, disposed on opposite sides of the lever, and means serving as pins passing through the apertures in said strap members in substantial contact with opposite edges of said lever and adapted alternately to engage in a notch of said sector.

4. A lever mechanism comprising a lever, a pair of detent members, each comprising a rod disposed generally longitudinally of said lever and each rod including a transversely extended detent section movable along an edge of said lever, the adjacent portions of said lever being free of apertures, spring means carried by each rod member and reacting at one end thereagainst and at the other end against said lever, a tie connected with said transverse detent sections and extending across said lever for holding said sections against opposite edges of said lever, and means connected with said rod members for disengaging both of said detent sections from said notched sector.

5. The invention set forth in claim 4, further characterized by a member pivotally connected to the outer ends of said rod members, and an actuating member pivotally connected to the generally intermediate portion of said member connecting said rod members.

6. In a lever and sector mechanism, including a notched sector and a lever movable relative thereto, a pair of strap members, each apertured at its ends, disposed on opposite sides of the lever adjacent said sector, rod means including laterally bent sections passing through the apertures of said strap members and disposed in engagement with opposite edges of said lever and adapted alternately to engage a notch in said sector, spring means reacting against said lever and said rod means for holding one or the other of said laterally bent sections in engagement with said sector, and means for disengaging both of said laterally bent rod sections from said sector.

7. In a lever mechanism, a sector, a lever mounted for movement along said sector, the latter being notched, a pair of apertured straps disposed transversely of said lever in embracing relation, detent members lying against opposite edges of said lever straps and extending through the apertures in said transverse straps, the distance between said detent members being such that when one members lies in a notch of said sector the other member is disposed in a position between notches, whereby a relatively small movement of said lever in one direction or the other corresponding to half the distance between notches will provide for movement of the other detent member into a notch, and means on said lever for disengaging both of said detent members from said sector.

CARL G. STRANDLUND.